June 9, 1959     A. L. W. WILLIAMS ET AL     2,889,796
WEAPON
Filed Aug. 18, 1955
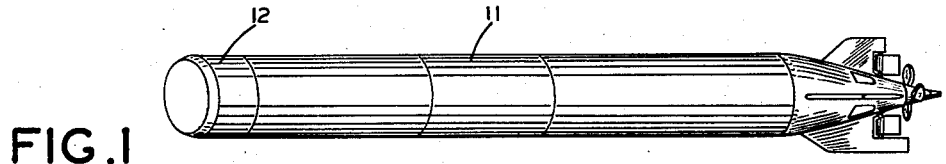
FIG.1
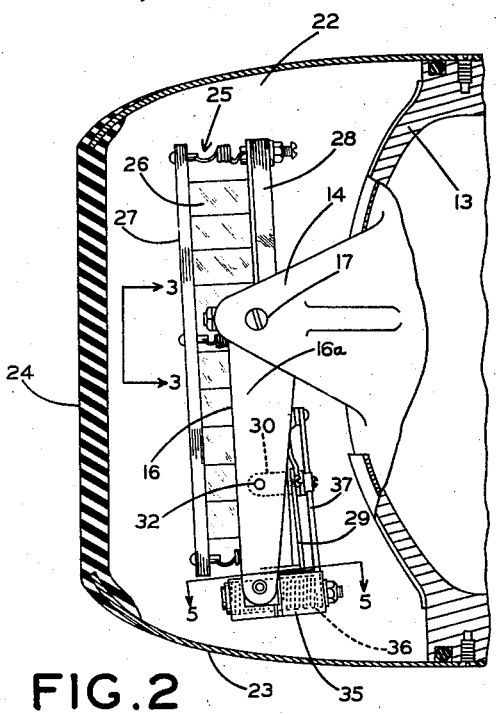
FIG.2
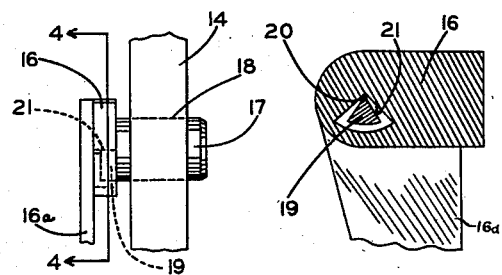
FIG.3     FIG.4
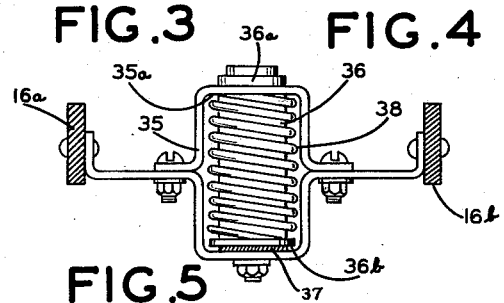
FIG.5
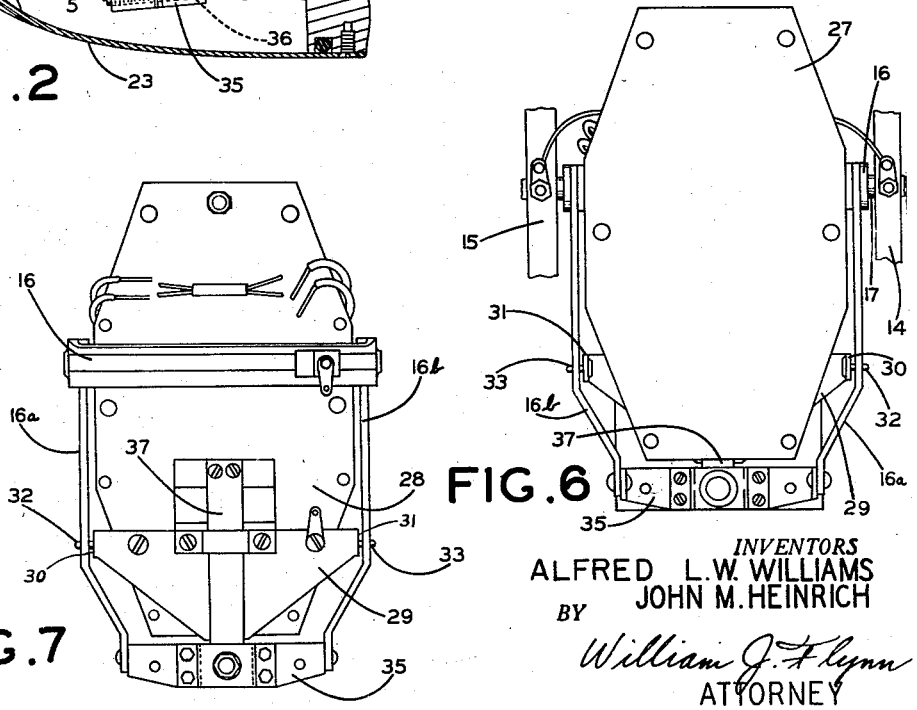
FIG.6
FIG.7
INVENTORS
ALFRED L. W. WILLIAMS
JOHN M. HEINRICH
BY
William J. Flynn
ATTORNEY

United States Patent Office 2,889,796
Patented June 9, 1959

2,889,796

WEAPON

Alfred Leslie Warwick Williams, Cleveland Heights, and John M. Heinrich, Cleveland, Ohio, assignors to Clevite Corporation, Cleveland, Ohio, a corporation of Ohio Application August 18, 1955, Serial No. 529,099

6 Claims. (Cl. 114—20)

This invention relates to an acoustic torpedo.

For seeking out and destroying enemy submarines and other targets, torpedoes have been developed which have an electroacoustic transducer for locating the target. Such transducers are mounted in the nose of the torpedo, and in the case of the "active," or pulse-echo, type of torpedo the transducer transmits through the water directional acoustic pulses which are reflected from the target, these reflections being received by the transducer. Upon locating a target, the torpedo's course is thereafter controlled in response to the acoustic echoes received by the transducer on the torpedo to direct the torpedo toward the target. In practice, considerable difficulty has been encountered with unwanted reflections from the surface of the water or from the sea bottom, which occurred because the transducer was "looking" in substantially the same direction as the torpedo, which was then heading toward the surface or toward the sea bottom.

The present invention is directed to an arrangement which avoids this difficulty by mounting the transducer so that it does not "look" toward the surface when the torpedo is operating near the surface and does not "look" toward the sea bottom when the torpedo is operating near the bottom.

Accordingly, it is an object of the present invention to provide an acoustic torpedo having its transducer mounted in a novel manner which avoids the reception of acoustic reflections from the surface or the sea bottom.

It is also an object of this invention to provide an acoustic torpedo having its transducer mounted to "look" in a direction determined by the sea pressure at the depth at which the torpedo is then operating.

The foregoing objects are accomplished in the preferred embodiment of the present invention by the provision of a torpedo having a liquid-filled chamber in its nose closed by a resilient flexible diaphragm extending across the front of the torpedo, a frame pivotally suspended in this chamber so as to hang vertically in any operating position of the torpedo, an electroacoustic transducer pivotally mounted on the frame, and a spring-biased bellows in the chamber acting between the frame and the transducer and responsive to the sea pressure applied to the liquid in the chamber through the diaphragm to control the position of the transducer, and thus the direction in which the transducer is then "looking."

Other and further objects and advantages of the present invention will be apparent from the following description of a preferred embodiment thereof, illustrated in the accompanying drawing.

In the drawing:

Figure 1 is a schematic perspective view of an acoustic torpedo embodying the present invention;

Figure 2 is a longitudinal section through the nose section of the torpedo, showing the present mounting for the transducer;

Figure 3 is an enlarged fragmentary end view of the pivotal suspension for the frame, viewed from the line 3—3 in Fig. 2;

Figure 4 is a section through this pivotal suspension, taken along the line 4—4 in Fig. 3;

Figure 5 is an enlarged view taken along the line 5—5 in Fig. 2 and showing the bellows acting between the frame and the transducer;

Figure 6 is a front elevational view of the transducer and the frame mounted on the nose section of the torpedo body; and Figure 7 is a rear elevational view of the frame and the transducer.

Referring to the drawings, the torpedo 11 is made up of several detachable sections, including a nose section 12 at the forward end of the torpedo. The cast housing body 13 of the nose section on the torpedo has two spaced forwardly projecting ears 14, 15 from which the frame 16 is pivotally suspended. Referring to Figs. 3 and 4, a trunnion 17 for the frame is fixedly mounted in a bore 18 in the ear 14. At its inner end the trunnion terminates in a wedge-shaped segment 19 which presents an upwardly facing edge 20. The frame 16 is formed with a larger wedge-shaped opening 21 which receives the edge segment 19. At the apex of this opening the frame 16 is seated on the edge 20, which provides a pivotal suspension for one side of the frame 16 from the ear 14.

The frame 16 is similarly pivotally suspended at its other side from the other ear 15 on the torpedo body.

A chamber 22 (Fig. 2) is formed in the nose section of the torpedo, enclosed by the torpedo body casting 13, a generally annular metal member 23 secured to the body casting 13 in fluid-tight fashion and projecting forwardly therefrom, and a flexible, resilient rubber or neoprene diaphragm 24 secured around the forward end of the metal annulus 23 and extending completely across the forward end of the chamber 22. This chamber is filled with suitable liquid, such as castor oil, serving as the transmission medium for the acoustic signals. Because of the flexibility of the diaphragm 24 this liquid assumes the same pressure as the sea pressure outside the torpedo.

The electroacoustic transducer 25 mounted within chamber 22 is made up of a plurality of suitably electroded piezoelectric crystal plates 26, which in one desirable embodiment may be Z-cut ammonium dihydrogen phosphate crystal plates arranged in an approximately elliptical pattern behind a "Lucite" window 27. The back plate 28, on which the array of crystal plates is mounted, is rigidly secured to a bracket 29, which has forwardly projecting side arms 30, 31 on either side of the crystal array. These side arms carry pivot pins 32, 33 respectively, which are pivotally received in the depending side arms 16a, 16b of the frame 16.

At their lower ends the side arms 16a, 16b of the frame 16 carry a two-piece bracket 35 which defines a rectangular opening in which is located a corrugated metal bellows 36 closed by ends caps 36a and 36b. The bellows is attached at its end cap 36a to the bracket 35. A leaf spring 37 is attached at its upper end to the back plate 28 on the transducer and at its lower end bears against the opposite end cap 36b of the bellows 36 to provide a coupling between the bellows and transducer 25. A coil spring 38, which loosely surrounds bellows 36, is in compression between the bellows end cap 36b and the inner wall 35a of the opposite end of bracket 35 to exert a bias on the bellows opposing compression of the bellows.

In operation, the frame 16, because of its pivotal suspension, hangs vertically whether the torpedo is traveling horizontally, upwardly at an angle or downwardly at an angle. The bellows 36 and spring 38 are so designed that the transducer 25 "looks" downward at an angle of about 3 degrees from the horizontal at shallow depth, at which the torpedo generally starts its search operation (that is, the central axis of the beam of acoustic energy transmitted by the torpedo is inclined downward at about 3 degrees from the horizontal).

Obviously, the sea pressure on the torpedo is a function of the depth at which the torpedo is operating. When the torpedo is near the sea bottom the sea pressure is higher, and this higher sea pressure is equalized by the pressure of the liquid in chamber 22 which compresses the bellows 36 in opposition to the restraining force exerted by spring 38 on the bellows. When this happens the transducer 25 tilts clockwise in Fig. 2 to direct its acoustic energy beam upward at a slight angle away from the sea bottom, to avoid receiving unwanted reflections from the sea bottom. Conversely, when the torpedo is near the surface the sea pressure is reduced and the correspondingly reduced pressure of the liquid in chamber 22 permits bellows 36 to expand under the force exerted by spring 38, causing the transducer 25 to tilt downward at a greater angle. For this reason, unwanted reflections of acoustic energy from the surface are avoided.

The spring 38 is so designed that it coacts with bellows 36 to control the angular tilting of the transducer 25 as a desired function of the depth at which the torpedo is operating.

From the foregoing, it will be apparent that the mechanism illustrated in the drawing is particularly well adapted for the accomplishment of the objects of this invention. However, it is to be understood that various modifications, omissions and refinements which depart from the disclosed embodiment may be adopted without departing from the spirit and scope of the present invention.

We claim:

1. In combination, a torpedo body having a nose section with a chamber therein, a flexible resilient diaphragm extending across the front of said chamber and exposed to the sea pressure outside the torpedo, a frame pivotally suspended from the torpedo body within said chamber to hang vertically, a piezoelectric transducer in said chamber pivotally mounted on said frame to direct acoustic energy through said chamber and through said diaphragm ahead of the torpedo, acoustic energy-transmitting liquid filling said chamber and responsive to the sea pressure on the diaphragm to exert a corresponding pressure within the chamber, and a pressure responsive spring-biased bellows exposed to the pressure exerted by the liquid in said chamber and connected between the frame and the transducer for controlling the position of said transducer relative to the vertically hanging frame in response to the pressure of the liquid in said chamber.

2. In combination, a torpedo body having a nose section with a chamber therein, a frame pivotally suspended from the torpedo body within said chamber, an electroacoustic transducer pivotally mounted on said frame, pressure-responsive means acting between the frame and the transducer to control the position of the transducer, a flexible diaphragm extending across the front of said chamber and exposed to the sea pressure outside the torpedo, and sound transmitting liquid filling said chamber and responsive to the pressure exerted on the diaphragm from outside the torpedo to exert a corresponding pressure on said pressure-responsive means for controlling the position of the transducer.

3. In an acoustic torpedo, the combination of a torpedo body having a nose section with a chamber therein, a flexible diaphragm extending across the front of said chamber, an electroacoustic transducer adjustably mounted in said chamber for directing acoustic energy through said chamber and said diaphragm ahead of the torpedo, acoustic energy-transmitting liquid filling said chamber, and pressure responsive means in said chamber exposed to the pressure of the liquid in said chamber and acting against the transducer to adjust the position of the transducer in accordance with the pressure of the liquid in said chamber to control the direction of the acoustic energy transmitted by the transducer.

4. In an acoustic torpedo, a torpedo body having a nose section with a chamber therein; an electroacoustic transducer adjustably mounted in said chamber for directional acoustic energy transmission and reception forwardly of said torpedo; and pressure-responsive means for adjusting the position of said transducer in accordance with the operating depth of the torpedo.

5. In an acoustic torpedo, a torpedo body having a nose section with a chamber therein; an electroacoustic transducer mounted in said chamber for directional acoustic energy transmission and reception forwardly of said torpedo, said transducer being mounted for limited pivotal movement about a horizontal axis to vary the direction of energy transmission and reception in a vertical plane; and pressure-responsive means for adjusting the position of said transducer about said axis in accordance with the operating depth of said torpedo.

6. In an acoustic torpedo, a torpedo body having a nose section with a chamber therein; a flexible resilient diaphragm extending across the front of said chamber and exposed to the sea pressure outside the torpedo; a frame suspended within said chamber for free pivotal movement about a horizontal axis; an electroacoustic transducer, adapted for directional transmission and reception of acoustic energy, mounted on said frame so as to transmit and receive energy in a direction generally forward of said torpedo, said transducer being mounted on said frame for pivotal movement relative thereto about a horizontal axis to vary said direction in a vertical plane; and means responsive to the sea pressure on said diaphragm for adjusting the position of said transducer relative to said frame in accordance with the operating depth of said torpedo.

No references cited.